US012436125B2

(12) United States Patent
Lee et al.

(10) Patent No.: US 12,436,125 B2
(45) Date of Patent: Oct. 7, 2025

(54) COMPOSITION FOR GAS SENSOR, GAS SENSOR INCLUDING THE COMPOSITION, AND METHOD FOR MANUFACTURING THE SAME

(71) Applicant: INDUSTRY-ACADEMIC COOPERATION FOUNDATION, YONSEI UNIVERSITY, Seoul (KR)

(72) Inventors: Kyu Hyoung Lee, Seoul (KR); Seung Joon Choi, Goyang-si (KR)

( * ) Notice: Subject to any disclaimer, the term of this patent is extended or adjusted under 35 U.S.C. 154(b) by 585 days.

(21) Appl. No.: 17/886,471

(22) Filed: Aug. 12, 2022

(65) Prior Publication Data

US 2023/0064551 A1 Mar. 2, 2023

(30) Foreign Application Priority Data

Aug. 13, 2021 (KR) ........................ 10-2021-0107032

(51) Int. Cl.
*G01N 27/12* (2006.01)
*C01G 41/00* (2006.01)
*G01N 33/00* (2006.01)

(52) U.S. Cl.
CPC ......... *G01N 27/125* (2013.01); *C01G 41/006* (2013.01); *G01N 27/128* (2013.01); *G01N 33/0044* (2013.01)

(58) Field of Classification Search
CPC .. C01G 41/006; G01N 27/125; G01N 27/128; G01N 27/129; G01N 33/0044
See application file for complete search history.

(56) References Cited

U.S. PATENT DOCUMENTS

2021/0339231 A1\* 11/2021 Mahinpey .............. B01J 35/612

FOREIGN PATENT DOCUMENTS

| JP | 2019-040896 A | 3/2019 |
| KR | 10-2046704 | 11/2019 |

OTHER PUBLICATIONS

English Specification of 10-2046704.
English Specification of JP2019-040896A.

\* cited by examiner

*Primary Examiner* — Brian A McCaig
(74) *Attorney, Agent, or Firm* — ANTONIO HA & U.S. PATENT, LLC

(57) ABSTRACT

Disclosed is a composition for a hydrogen sulfide gas sensor containing copper, lithium and $NiWO_4$, wherein the $NiWO_4$ is co-doped with the copper and the lithium. Also disclosed is a method for preparing a composition for a hydrogen sulfide gas sensor, the method including steps of: (1) mixing NiO, $Li_2CO_3$, CuO and $WO_3$ powders together at a molar ratio of 0.720 to 0.725:1.0 to 1.05:0.0120 to 0.0125:0.25 to 0.255, followed by calcination, thus preparing a powder mixture; (2) applying pressure to the powder mixture by a cold isostatic pressing process, thus preparing a green body; and (3) subjecting the green body to normal-pressure sintering.

9 Claims, 8 Drawing Sheets

COMPOSITION FOR GAS SENSOR, GAS SENSOR INCLUDING THE COMPOSITION, AND METHOD FOR MANUFACTURING THE SAME

CROSS-REFERENCE TO RELATED APPLICATION(S)

This application claims priority to Korean Patent Application No. 10-2021-0107032 filed in the Korean Intellectual Property Office on Aug. 13, 2021, the disclosure of which is incorporated by reference herein in its entirety.

TECHNICAL FIELD

The present invention relates to a composition for a gas sensor, and more particularly, to a composition for a gas sensor having high selectivity and sensitivity to a detection-target gas, a gas sensor including the same, and a method for preparing the same.

DESCRIPTION OF THE RELATED ART

In recent years, there has been an increasing need to develop ultra-sensitive gas sensors for precisely detecting trace amounts of biomarker gases from human breath. In various fields covered by gas sensors, studies on breath sensors for healthcare monitoring, which can diagnose a specific disease at an early stage by detecting biomarker gases, have recently attracted a great deal of attention.

The term "biomarker gases" may refer to gases exhaled from the human mouse. In principle, volatile organic compound gases produced by reactions in cells inside the human body are transported to the lungs through the blood and released out of the mouth through gas exchange. Therefore, various biomarker gases such as ammonia, nitric oxide, acetone, toluene, pentane, and hydrogen sulfide exist in the exhaled breath, and these gases have been reported as biomarkers for kidney disease, asthma, diabetes, lung cancer, heart disease, and bad breath, respectively. Since the exhaled breath contains hundreds of different gases, sensors for use as breath sensors for healthcare monitoring must be able to selectively detect a specific biomarker gas.

In addition, biomarker gases contained in the exhaled breath are each released at a very low concentration ranging from 10 ppb (part per billion) to 10 ppm (part per million). In order to detect such biomarker gases, it is required to develop highly sensitive gas sensors capable of accurately detecting these biomarker gases at ppb level concentrations.

In particular, hydrogen sulfide is found in volcanic gases or hot spring water in nature, occurs in wastewater treatment plants and excreta in human habitation areas, and is considered a colorless, flammable, corrosive, toxic, and odorous hazardous gas. In addition, as hydrogen sulfide is emitted as a by-product in the fossil fuel refining process, it is considered a major atmospheric pollutant. Since this hydrogen sulfide is heavier than air, it accumulates from the floor in an unventilated space. If a person is far away from the source of the hydrogen sulfide leak, it takes time for the person to detect the presence of hydrogen sulfide by smell, and thus by the time the person smells hydrogen sulfide, the hydrogen sulfide leak may already be serious. Therefore, hydrogen sulfide gas is a hazardous factor to be measured in the working environment, and it is also a substance that directly affects workers when it occurs in an industrial field. Therefore, it is essential to develop a material for a sensor for detecting changes in the atmospheric hydrogen sulfide concentration in real time in terms of air environment management and safety management of the working environment.

Various technological methods capable of detecting the concentration of an analyte of interest have been proposed. Thereamong, the most common form is a metal oxide semiconductor (MOS)-based gas sensor. The metal oxide semiconductor (MOS)-based gas sensor detects the change in resistance caused by adsorption and desorption between a material surface and gas molecules, thereby detecting a gas of interest. The metal oxide semiconductor-based gas sensor can quantitatively detect a specific gas concentration in real time by analyzing the ratio of resistance in air to resistance in a specific gas.

The reason why many MOS-based gas sensors may be developed is that they have advantages over other types of gas sensors such as optical gas sensors and electrochemical gas sensors in that they are easily configured and easy to carry due to their small size. In addition, they also have advantages in terms of costs such as low replacement and manufacturing costs, and simple processes. However, these MOS-based gas sensors are very inferior to gas chromatography in terms of sensitivity and selectivity, and thus a lot of research thereon has still been conducted.

In particular, typical metal oxide materials used in MOS-based gas sensors are porous nanostructures, and have an advantage in that they can lower the detection limit of gas sensors in that they are very advantageous for chemical adsorption between gas molecules and materials thanks to their large surface area.

As an example of a conventional art related to MOS-based gas sensors, Korean Patent No. 10-2046704 (2018) discloses a technology for forming a hollow sphere, which includes: subjecting a complex sphere, produced by an electrospray technique and including both a $SiO_2$ precursor and a metal oxide precursor, to a high-temperature heat-treatment process to a core/shell structured complex sphere having core-$SiO_2$/shell-metal oxide; and then selectively removing $SiO_2$ from the complex sphere by an etching process to induce the formation of mesopores and macropores in the metal oxide. Furthermore, according to the above Korean Patent No. 10-2046704, a nanoparticle catalyst is additionally bound to the complex hollow, thereby providing a gas sensor member in which the nanoparticle catalyst is uniformly distributed thereon and which contains mesopores and macropores and shows a maximized chemisorption reaction with gas molecules.

In addition, technologies for the synthesis of materials for typical metal oxide semiconductor (MOS)-based gas sensors reported to date have been commonly developed in the direction of inducing and controlling the formation of porous structures in the materials. In the case of the above-mentioned conventional technologies, nano-dimensional materials are easily deformed in their operating environment due to the structural instability caused by their high surface energy, and have functional limitations such as short sensing life, poor reproducibility, and low reliability. Therefore, the above-mentioned conventional technologies have a problem in that they do not easily act as hydrogen sulfide sensors in hazardous work environments with high volatility and environments requiring long-term operation.

However, in the case of nanostructure materials, environmental changes due to high surface energy, external stimuli, or their tendency to stabilize over time cause structural deformation of the nanostructure materials, which results in impaired functions such as weak reproducibility for gas sensing and low sensing lifespan. Accordingly, there is a need for gas sensing technology which exhibits excellent reproducibility and highly selective reactivity with hydrogen sulfide while ensuring chemical stability.

Meanwhile, $NiWO_4$, a base material contained in a composition provided in the present invention, is a p-type metal oxide semiconductor having an indirect bandgap of 2.77 eV (which increases to a level of about 4.66 eV at a high process temperature), and has excellent optical properties and chemical stability. However, $NiWO_4$ has very weak hole conduction properties due to the small polaron hopping (SPH) conduction mechanism, and thus has been applied in limited areas, such as photocatalysts and base materials for p-type transparent electrodes.

Many studies have been conducted to improve the properties of the P-type electrode and sensor characteristics of the material ($NiWO_4$), and methods for synthesizing $NiWO_4$ materials having morphologies such as nanowires, nanorods, nanotubes, nanowrinkled structures, nanostrawberry structures, or nano-sized single crystals are known. $NiWO_4$ is mainly synthesized by hydrothermal synthesis and solid-state-reaction, and techniques of fabricating $NiWO_4$ thin films using deposition methods such as spin coating, sputtering, and E-beam evaporation are also known.

PRIOR ART LITERATURE

Korean Patent No. 10-2046704
Japanese Unexamined Patent Application Publication No. 2019-040896

SUMMARY

An object of the present invention is to provide a hydrogen sulfide gas sensor for detecting resistance changes, which includes a composition for a gas sensor containing a $NiWO_4$ co-doped with copper and lithium, has high selectivity and sensitivity to a detection-target gas, and is operable at high temperature.

Another object of the present invention is to provide a composition for a hydrogen sulfide sensor, which has excellent reproducibility, durability, reliability and stability, and, in particular, may exhibit an excellent sensing function comparable to nanomaterial-based MOS gas sensors by inducing selective chemical adsorption of and reaction with hydrogen sulfide ($H_2S$) due to its compositional feature despite its bulk state with few pores.

The present invention provides a composition for a hydrogen sulfide gas sensor containing copper, lithium and $NiWO_4$, wherein the $NiWO_4$ is co-doped with the copper and the lithium.

The composition may be represented by the following Formula 1:

$Cu_xLi_yNi_{1-x-y}WO_4$,          [Formula 1]

wherein X and Y are 0≤x<1 and 0≤y<1, respectively. The composition is most preferably $Cu_{0.25}Li_{0.025}Ni_{0.725}WO_4$.

The present invention also provides a method for preparing a composition for a hydrogen sulfide gas sensor, the method including steps of: (1) mixing NiO, $Li_2CO_3$, CuO and $WO_3$ powders together at a molar ratio of 0.720 to 0.725:1.0 to 1.05:0.0120 to 0.0125:0.25 to 0.255, followed by calcination, thus preparing a powder mixture; (2) applying pressure to the powder mixture by a cold isostatic pressing process, thus preparing a green body; and (3) subjecting the green body to normal-pressure sintering.

The calcination in step (1) is preferably performed at a temperature of 850° C. to 900° C. for 12 to 16 hours in an atmospheric atmosphere.

The cold isotropic pressing in step (2) includes applying a pressure of 100 to 150 MPa.

The sintering in step (3) is preferably performed at a temperature of 900 to 1,100° C. in an atmospheric atmosphere.

The present invention also provides a hydrogen sulfide gas sensor including: a substrate; an electrode; and a sensing layer formed on the upper, lower or side surface of the electrode and including the above-described composition for a hydrogen sulfide gas sensor.

The electrode may be a silver (Ag) electrode.

The substrate may be a ceramic and/or alumina substrate.

The composition for a gas sensor according to the present invention may have excellent sensitivity and selective detection ability for hydrogen sulfide ($H_2S$) gas, may have excellent durability and stability and maximized reliability, and may provide, at a bulk scale, excellent gas-sensing ability comparable to those reported for gas sensors based on nanostructure materials.

In addition, the hydrogen sulfide gas sensor for detecting resistance changes according to the present invention includes a composition for a gas sensor containing a $NiWO_4$ co-doped with copper and lithium, has high selectivity and sensitivity to a detection-target gas, and is operable at high temperature, particularly about 300° C.

In addition, the composition for a gas sensor according to the present invention may exhibit the ability to detect a trace amount (1 ppb or less) of hydrogen sulfide gas, may quantitatively detect changes in the concentration of hydrogen sulfide gas in real time, and may provide long sensing life and reproducibility.

BRIEF DESCRIPTION OF THE DRAWINGS

FIG. 5 shows a total of 44 gas sensing test results;

DETAILED DESCRIPTION

Figure 1:
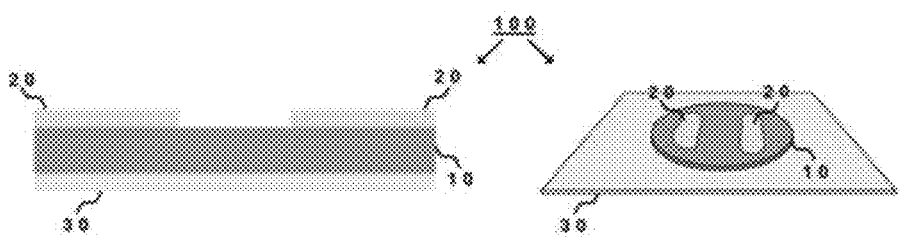
FIG. 1 schematically shows a hydrogen sulfide gas sensor for detecting a bulk resistance change according to the present invention.

The present invention will be described in detail below. In the following description of the present invention, detailed descriptions of related known configurations or functions may be omitted.

The terms or words used in the specifications and claims should not be interpreted as being limited to typical meanings or dictionary definitions, but should be interpreted as having meanings and concepts relevant to the technical spirit of the present invention.

It should be understood that the embodiments described in the specification and the configurations shown in the drawings are merely preferred examples of the present invention and do not represent all of the technical spirits of the present invention and thus various modifications and variations to the present invention and equivalents thereto may be made at the time when the present invention was filed.

Unless otherwise defined, technical and scientific terms used herein have the same meaning as commonly understood by one of ordinary skill in the art to which the present invention pertain. In the following description and the accompanying drawings, detailed description of known functions and configurations will be omitted when it may obscure the subject matter of the present invention.

In addition, as used herein, each singular form is intended to include a plural form as well, unless the context clearly indicates otherwise.

In addition, % used indistinctly herein means % by weight, unless specifically indicated.

The present invention provides a Mott-insulator-based composition, which is chemically stable in a high-temperature oxidizing or reducing atmosphere and recovers after selectively reacting with hydrogen sulfide, which is generated in fuel refining processes, wastewater treatment processes, etc., is harmful to the human body, causes environmental pollution, and is known as a major biomarker gas of the human body.

The composition for a gas sensor according to the present invention contains: a cationic dual-transition-metal oxide ($NiWO_4$) composed of nickel and tungsten; lithium; and copper. The composition containing the cationic dual-transition-metal oxide ($NiWO_4$), copper, and lithium is preferably one in which the nickel site is co-doped with copper and lithium, and may be represented by $Cu_xLi_yNi_{1-x-y}WO_4$ (where X and Y are $0 \leq x < 1$ and $0 \leq y < 1$, respectively).

In this case, the reason why copper and lithium are selected as dopants in the preparation of the co-doped composition ($Cu_xLi_yNi_{1-x-y}WO_4$ (where X and Y are $0 \leq x < 1$ and $0 \leq y < 1$, respectively) is as follows.

In the case of copper, when the nickel site having 3d orbital valence electrons is substituted with copper containing 3d orbital valence electrons, valence band dispersion may be induced, thereby weakening the strength of interaction between valence electrons. Meanwhile, in the case of lithium which is a metal having the lowest ionization energy, when a cation site in the $NiWO_4$ composition is substituted with lithium, tungsten with a high reduction potential may be partially reduced by lithium to induce pentavalent tungsten (W5+) active sites, from which a small polaron may be derived. In addition, it is believed that the derived small polaron will be involved in polaron-electron coupling of reducing gas molecules, making chemical adsorption more advantageous only for the reducing gas molecules.

Accordingly, to synthesize the co-doping composition ($Cu_xLi_yNi_{1-x-y}WO_4$) (where X and Y are $0 \leq x < 1$ and $0 \leq y < 1$, respectively), NiO, CuO, $Li_2CO_3$ and $WO_3$ powders are mixed together at a stoichiometric ratio or a suitable cation ratio and subjected to solid-state-reaction, thus preparing powder and a bulk sample.

In this case, to evaluate the effect of doping on the synthesized composition, compositions composed of $NiWO_4$, $Li_{0.025}Ni_{0.975}WO_4$, $Cu_{0.25}Ni_{0.75}WO_4$ and $Cu_{0.25}Li_{0.025}Ni_{0.725}WO_4$, respectively, were prepared.

The term "solid-state-reaction" refers to a reaction between solid reactants occurring in a specific high-temperature atmospheric atmosphere, and includes cation diffusion and grain densification and coarsening. In addition, the solid-state reaction may be called a "solid-phase method".

A composition for a hydrogen sulfide gas sensor 100 according to the present invention may be prepared by a two-step solid-state process, and the composition according to the present invention and a comparative composition were prepared separately.

In this case, a powder form is prepared by a first-step solid-state process, and a bulk sample is prepared from the prepared powder sample by a second-step solid-state process.

In this case, a pore-free bulk structure is formed so that the possibility of chemical adsorption by pores is excluded, and then the effect of doping on hydrogen sulfide sensing is compared between compositions.

A bulk sample with minimized pores has very low surface energy compared to a nanostructure, and thus exists in a very stable structure.

Figure 2:
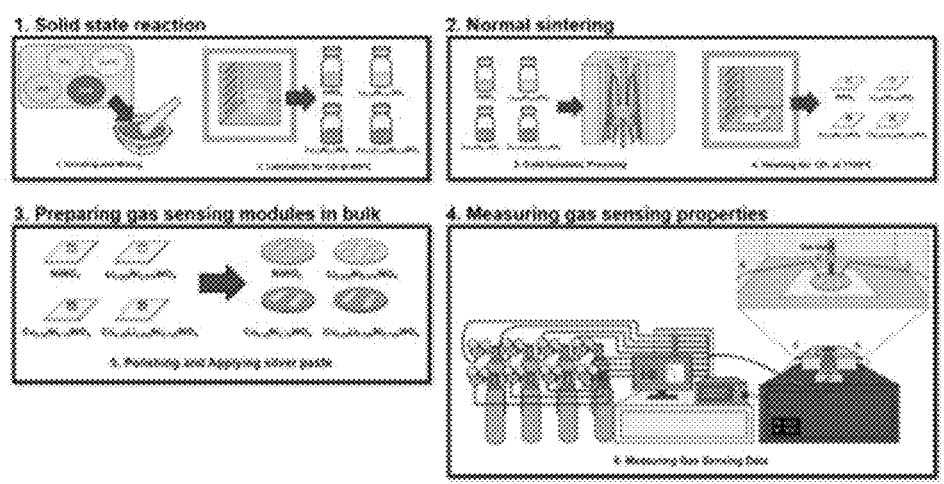
FIG. 2 schematically shows a method for preparing a $Cu_xLi_yNi_{1-x-y}WO_4$ (where X and Y are 0≤x<1 and 0≤y<1, respectively) composition and a process of performing a gas sensing test for a prepared gas sensor.

The above-described solid phase method consists of preparing single-phase powder by calcination and preparing a bulk sample by normal-pressure sintering. The calcination may be performed at a temperature of 850° C. to 900° C. for 12 to 16 hours in an atmospheric atmosphere, most preferably at a temperature of 900° C. for 12 hours. The normal-pressure sintering may be performed by applying a pressure of 100 MPa to 150 MPa, most preferably 150 MPa, to the prepared powder by a cold isostatic pressing process, thus preparing a green body, and then sintering (heat-treating) the green body at a temperature of 900 to 1,100° C., most preferably 1,100° C., for 12 hours in an atmospheric atmosphere (FIG. 2).

In this case, if the calcination temperature is lower than the lower limit of the above-described range, calcination temperature, a problem may arise in that less crystallization of the compounds constituting the sample composition occurs, and thus the sample is not synthesized. If the calcination temperature is higher than the upper limit of the above-described range, a problem may arise in that very large grain growth occurs, resulting in a significant increase in the difficulty in reducing large pores existing between large grains in the subsequent sintering process.

In addition, if the pressure is lower than the lower limit of the above-described range, a problem may arise in that the desired shape is not easily obtained because the pressure for making the green body is insufficient. If the pressure is higher than the upper limit of the above-described pressure, a problem may arise in that water enters the inside of the sample during the pressure application process, causing the sample to become wet or contaminated by the cutting oil/water mixture.

Regarding the sintering temperature, considering that the melting point of $NiWO_4$ is 1,400° C., the theoretically suitable sintering temperature according to the Temman Temperature principle is 900° C., which corresponds to 70% of the absolute melting point (1673K). It was confirmed that the most preferred sintering temperature was found to be 1,100° C.

In particular, it was confirmed that, as the sintering temperature increases, the pores between condensed grains are reduced by grain coarsening and densification, which is advantageous in increasing the relative density. Thus, if the sintering temperature is lower than the lower limit of the above-described range, a problem may arise in that the desired reaction does not proceed, and if the sintering temperature is higher than the upper limit of the above range, a problem may arise in that a part of the sample is melted and flows down without being synthesized according to the shape of the green body.

The prepared bulk sample for each composition is synthesized in the form of a cylinder with a diameter of 10 mm, and in order to fabricate a gas sensor from the bulk sample, the bulk sample is polished to obtain a 1 mm-thick coin-shaped bulk sample 10. The lower surface of the fabricated bulk coin 10 is supported by a 1-mm-thick alumina substrate 30, and a silver paste is applied to the upper surface of the coin 10, thereby preparing a metal electrode. Thereby, a bulk-based hydrogen sulfide gas sensor 100 is fabricated (FIG. 2).

The present invention will be described in more detail below with reference to examples. These examples are only for explaining the present invention in more detail, and it will be apparent to those of ordinary skill in the art that the scope of the present invention according to the subject matter of the present invention is not limited by these examples.

Example: Gas Sensor Fabrication

As transition metal oxides according to the present invention, nickel oxide [NiO, Kojundo, 99.97%], lithium carbonate [$Li_2CO_3$, Kojundo, 99.99%], copper oxide [CuO, Kojundo, 99.9%], and tungsten oxide [W03, Kojundo, 99.9%] were prepared per 50 g of each composition to be prepared, as shown in Table 1 below, and then mixed together. Each of the mixtures was calcined in a box furnace at a temperature of 900° C. in an atmospheric atmosphere, thereby preparing powders composed of $NiWO_4$, $Li_{0.025}Ni_{0.975}WO_4$, $Cu_{0.25}Ni_{0.75}WO_4$, and $Cu_{0.25}Li_{0.025}Ni_{0.725}WO_4$ compositions, respectively (FIG. 1).

TABLE 1

| Sample | NiO | $WO_3$ | CuO | $Li_2CO_3$ |
|---|---|---|---|---|
| S1 | 12.183 g | 37.817 g | 0 | 0 |
| S2 | 11.937 g | 38.002 g | 0 | 0.151 g |
| S3 | 9.101 g | 37.668 g | 3.231 g | 0 |
| S4 | 8.841 g | 37.851 g | 3.247 g | 0.151 g |

Sample Preparation Per 50 g

A pressure of 150 MPa was applied to each of the prepared powder compositions by a cold isostatic pressing process to obtain pellet-shaped green bodies. The green body including each of the compositions was subjected to normal-pressure sintering in a box furnace at a temperature of 1,100° C. in an atmospheric atmosphere to induce grain coarsening and densification, thereby preparing bulk samples with few pores (FIG. 2).

Each of the prepared bulk samples was polished to obtain 1-mm-thick coins 10, and a silver paste was applied to the upper surface of each coin to form a metal electrode 20. Next, the lower surface of each coin 10 was supported by a ceramic substrate 30 made of alumina, thereby fabricating bulk-based gas sensors 100 (FIG. 1). See FIG. 2.

Evaluation Example 1: Structural Analysis

Figure 3:
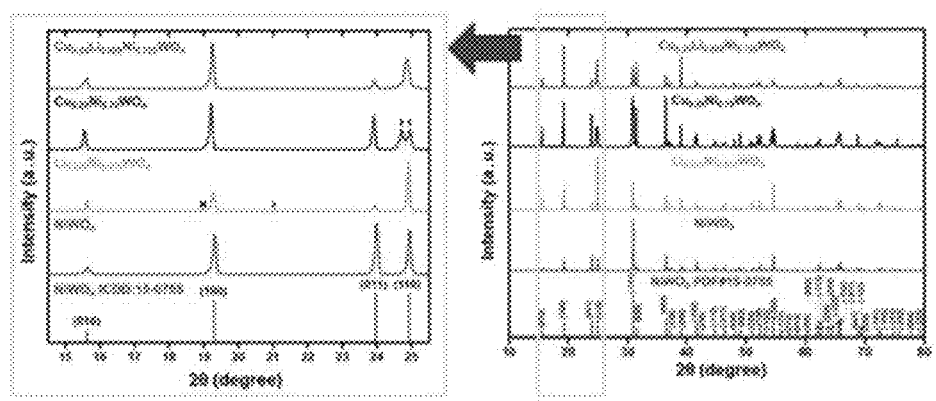
FIG. 3 shows XRD crystalline phase patterns of bulk samples of four prepared compositions ($NiWO_4$, $Li_{0.025}Ni_{0.975}WO_4$, $Cu_{0.25}Ni_{0.75}WO_4$, and $Cu_{0.25}Ni_{0.025}Ni_{0.725}WO_4$) The left XRD patterns are those obtained by enlarging the 14.5° to 25.5° angle section in each whole pattern to confirm the presence of secondary phase.

For structural analysis of the bulk sample including each of the prepared compositions ($NiWO_4$, $Li_{0.025}Ni_{0.975}WO_4$, $Cu_{0.25}Ni_{0.75}WO_4$, and $Cu_{0.25}Li_{0.025}Ni_{0.725}WO_4$), the bulk sample was powdered, and then powder XRD analysis was performed to examine whether a single phase was synthesized (see FIG. 3). As shown in XRD spectra obtained by enlarging the 14.5° to 25.5° angle section in the right of FIG. 3, it can be confirmed that, when the nickel site was co-doped with 2.5 at % Li and 25 at % Cu, secondary peaks in addition to the main peak or separation of the main peak appeared, suggesting that $Li_{0.025}Ni_{0.975}WO_4$ and $Cu_{0.25}Ni_{0.75}WO_4$ were not synthesized well as single phases. However, it can be confirmed that the $Cu_{0.25}Li_{0.025}Ni_{0.725}WO_4$ composition obtained by co-doping with equal amounts of lithium and copper was synthesized well as a single phase, suggesting that, when the nickel site is co-doped with copper and lithium, the copper and lithium components can synergistically increase the solid solution limit for the nickel site (FIG. 3).

The XRD spectra shown FIG. 3 were subjected to Rietveld refinement to obtain the crystal system, space group, lattice constant, lattice angle, and unit cell volume of each composition as shown in Table 2 below. It can be confirmed that all the compositions follow the Monoclinic system and have a space group of P 2/c. In addition, it can be confirmed that the lattice constants "a" and "b" contracted and increased upon co-doping with lithium and copper and were consistent well with the middle values between the lattice constants shown upon doping with each of lithium and copper, suggesting that the changes in lattice constants by doping follow Vegard's Lattice Law well. This is a base on which the fact that the nickel site was properly substituted with each dopant can be macroscopically confirmed.

shows scanning electron microscopy (SEM) images showing the morphologies of each powder and bulk sample. In particular, it can be confirmed that the number of pores on the surface morphology image (FIG. 4(p)) of the bulk sample including the $Cu_{0.25}Li_{0.025}Ni_{0.725}WO_4$ composition is small. This makes it possible to analyze the factors of selective response to hydrogen sulfide as shown in FIGS. 5, 6, 7, 9 and 10 while excluding the possibility of adsorption by pores. In addition, the surface morphology of the bulk sample having few pores, unlike a porous structure, can be confirmed, thereby ensuring the structural stability of the sample due to its low surface energy.

Evaluation Example 3: Gas Sensing Analysis

To analyze the gas sensitivity of the gas sensor 100 including each of the prepared compositions ($NiWO_4$, $Li_{0.025}Ni_{0.975}WO_4$, $Cu_{0.25}Ni_{0.75}WO_4$, $Cu_{0.25}Li_{0.025}Ni_{0.725}WO_4$), a total of 11 different gases (FIG. 5) at concentrations of 10 ppm were injected into the chamber of a gas sensing system (FIG. 2) under an atmospheric atmosphere at a temperature of 300° C., and detection of changes in the surface resistance of each sensor material by the gases was performed. In addition, based on data about the resistance changes, the maximum response value for each gas was calculated (FIG. 5), and the results are summarized in FIG. 6.

Figure 6:
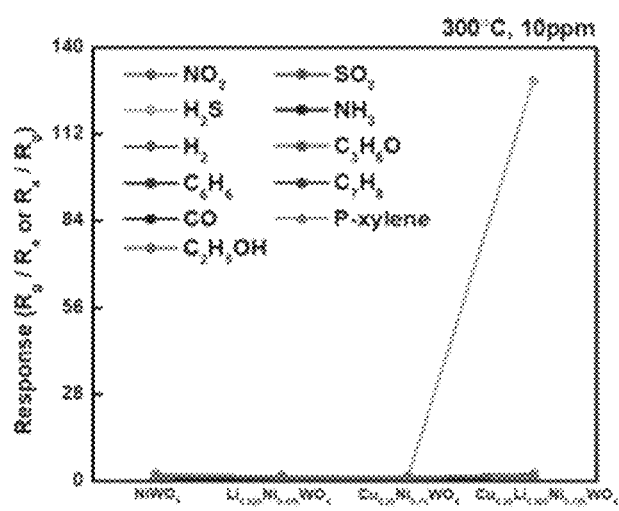
FIG. 6 shows a comparison of the maximum response value between the compositions depending on the type of gas based on the results of the 44 gas sensing test results shown in FIG. 5.
Figure 7:
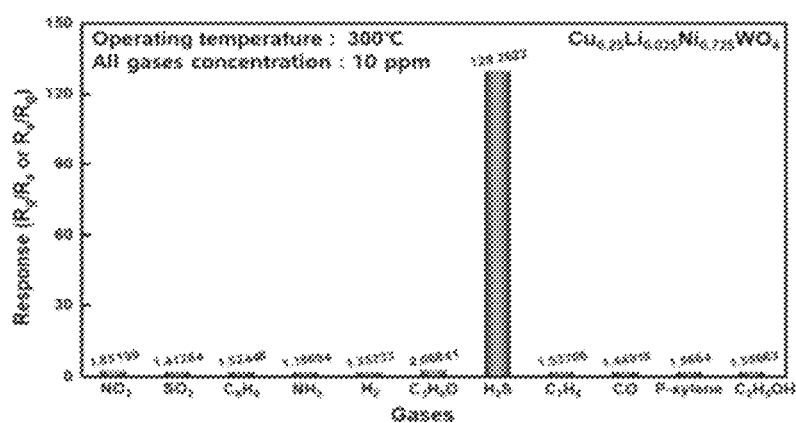
FIG. 7 shows the results of examining the response of $Cu_{0.25}Li_{0.025}Ni_{0.725}WO_4$ (confirmed in FIG. 6) to each type of gas at a temperature of 300° C., and shows that $Cu_{0.25}Ni_{0.025}Ni_{0.725}WO_4$ exhibits a highly selective response to hydrogen sulfide.

From the results in FIG. 6, it can be confirmed that only the bulk-based gas sensor including the $Cu_{0.25}Li_{0.025}Ni_{0.725}WO_4$ composition obtained by co-doping the nickel site with lithium and copper shows a selective change in resistance in response to hydrogen sulfide. FIG. 7 roughly summarizes the degree of response of the $Cu_{0.25}Li_{0.025}Ni_{0.725}WO_4$ composition to each gas based on the results shown in FIG. 6, and emphasizes the excellent selective response of the $Cu_{0.25}Li_{0.025}Ni_{0.725}WO_4$ composition to hydrogen sulfide.

Meanwhile, in order to examine surface conduction type by checking the change in resistance of each sample by exposure to a gas atmosphere, observation was made for changes in the resistance of the gas sensors including the prepared compositions ($NiWO_4$, $Li_{0.025}Ni_{0.975}WO_4$, $Cu_{0.25}Ni_{0.75}WO_4$, and $Cu_{0.25}Li_{0.025}Ni_{0.725}WO_4$), respectively, in each of an oxidizing atmosphere formed by the

TABLE 2

Powder XRD-Rietveld Refinement Analysis

| Sample Composition | Crystal System | Space Group | a | b | c | β | Cell Volume |
|---|---|---|---|---|---|---|---|
| $NiWO_4$ | Monoclinic | P12/c 1 | 4.6007 Å | 5.6658 Å | 4.9106 Å | 90.01° | 128.003 Å$^3$ |
| $Li_{0.025}Ni_{0.975}WO_4$ | Monoclinic | P 12/c 1 | 4.5992 Å | 5.6714 Å | 4.9154 Å | 90.02° | 128.216 Å$^3$ |
| $Cu_{0.25}Ni_{0.75}WO_4$ | Monoclinic | P 12/c 1 | 4.6095 Å | 5.6748 Å | 4.9150 Å | 90.00° | 128.565 Å$^3$ |
| $Cu_{0.25}Li_{0.025}Ni_{0.725}WO_4$ | Monoclinic | P 12/c 1 | 4.6091 Å | 5.6822 Å | 4.9053 Å | 90.02° | 128.469 Å$^3$ |

Evaluation Example 2: Analysis of Morphology

Figure 4:
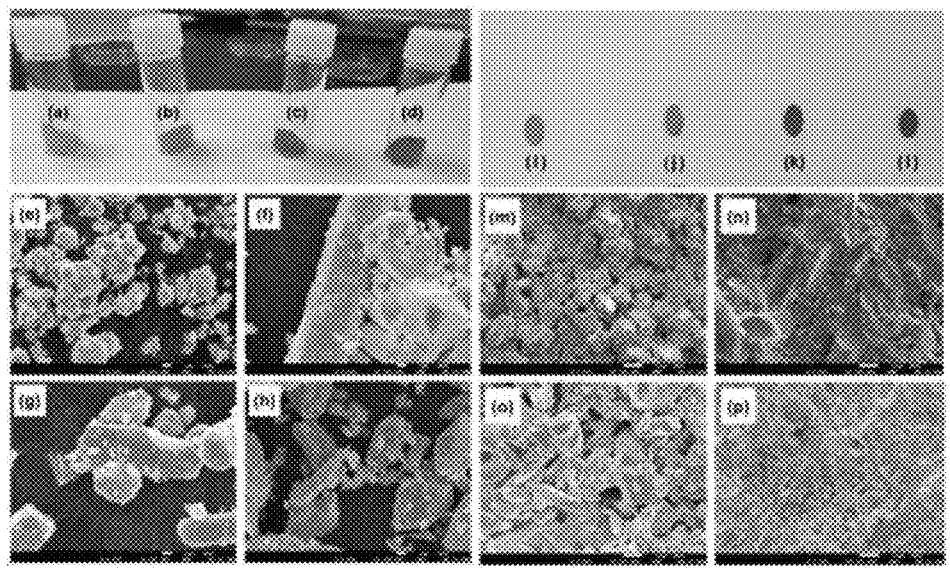
FIGS. 4(a) to 4(h) show actual photographs and scanning electron microscopy (SEM) morphologies of the four prepared composition powder samples.
FIGS. 4(i) to 4(p) show actual photographs and scanning electron microscopy (SEM) morphologies of the four composition samples prepared through normal-pressure sintering.
Figure 5:
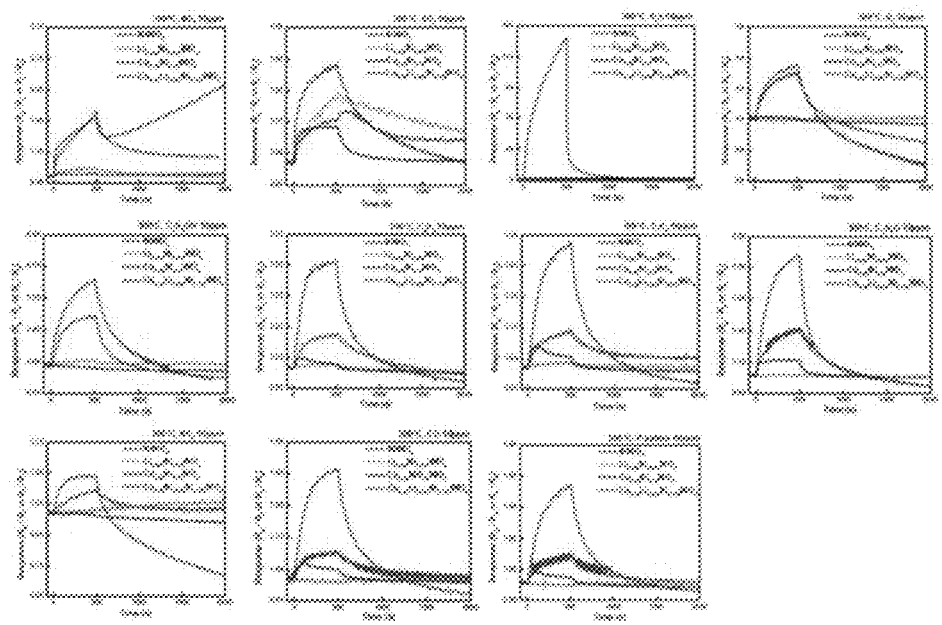
FIG. 5 depicts response vs. time graphs obtained by injecting a total of 11 different gases ($NO_2$, $H_2S$, $H_2$, $C_6H_6$, CO, $C_2H_5OH$, $SO_2$, $NH_3$, $C_3H_6O$, $C_7H_8$, and p-xylene) at concentrations of 10 ppm into gas sensors including the four compositions, respectively, placed in a gas sensing system (FIG. 2) at 300° C. in a general atmospheric atmosphere, measuring changes in surface resistance resulting from changes in the compositions, and then calculating the ratio of the resistance after injection of the gases to the resistance before injection of the gases as a response value. In addition.

FIG. 4 shows images of the actual appearances of as-calcined powders including the compositions ($NiWO_4$, $Li_{0.025}Ni_{0.975}WO_4$, $Cu_{0.25}Ni_{0.75}WO_4$, and $Cu_{0.25}Li_{0.025}Ni_{0.725}WO_4$), respectively, and bulk samples obtained immediately after sintering of the powders, and oxidizing gas $NO_2$ (10 ppm, 300° C.) and a reducing atmosphere formed by the reducing gas $H_2S$ (10 ppm, 300° C.) (FIG. 9).

Figure 8:
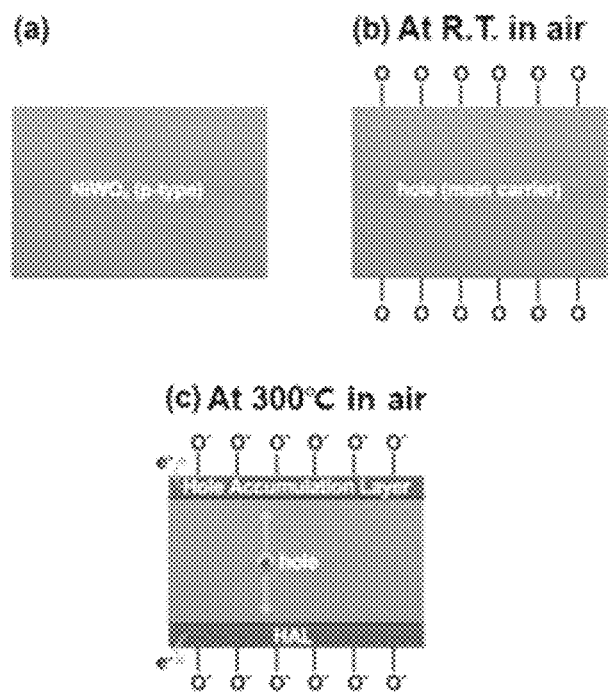
FIG. 8 shows that the electron exchange between $NiWO_4$ having p-type conductivity and surface oxygen species with high electronegativity occurs when the temperature is changed from room temperature to 300° C., and also schematically shows a principle in which a hole accumulation layer (HAL) is formed on the surface by the electron exchange.

The $NiWO_4$ composition has p-type conductivity. Thus, as shown in FIG. 8, electrons on the surface of the sample move to surface oxygen species with high electronegativity in an atmospheric atmosphere at 300° C., and then holes are confined to the sample surface site, and the resulting layer may be referred to as a hole accumulation layer (HAL). When $NiWO_4$ with P-type conductivity is exposed to an oxidizing atmosphere, it loses surface electrons and the HAL thickness increases due to hole accumulation, which leads to a decrease in resistance. Conversely, when $NiWO_4$ is exposed to a reducing atmosphere, the sample gains electrons from the reducing atmosphere, and thus the thickness of the HAL decreases, which leads to an increase in resistance. Therefore, as shown in FIG. 9, when $NiWO_4$ having p-type conductivity is exposed to an oxidizing $NO_2$ atmosphere, the resistance thereof decreases, and when $NiWO_4$ is exposed to a reducing $H_2S$ atmosphere, the resistance thereof increases.

Figure 9:
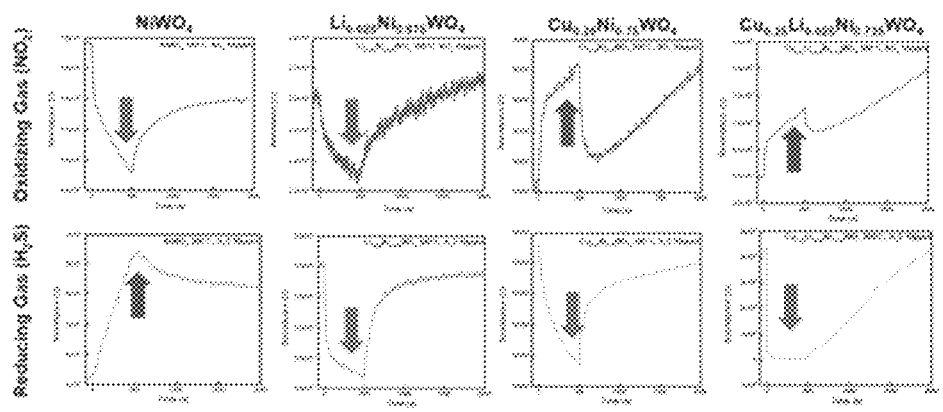
FIG. 9 shows a change in the resistance of the $NiWO_4$ composition with p-type conductivity (shown in FIG. 8) between an oxidizing atmosphere and a reducing atmosphere, and also shows the changes in resistance and surface conduction type by doping with lithium, doping with copper, or co-doping with lithium and copper.

Meanwhile, as shown in FIG. 9, it could be confirmed that, as the resistance of the compositions other than $NiWO_4$ changed depending on each atmosphere, the surface conduction type of the compositions changed. It was confirmed that the $Li_{0.025}Ni_{0.725}WO_4$ composition obtained by lithium doping showed n-type conductivity only in the reducing atmosphere, and the gas sensors including the $Cu_{0.25}Ni_{0.725}WO_4$ and $Cu_{0.25}Li_{0.025}Ni_{0.725}WO_4$ compositions, respectively, showed n-type conductivity in both the oxidizing atmosphere and the reducing atmosphere.

Figure 10:
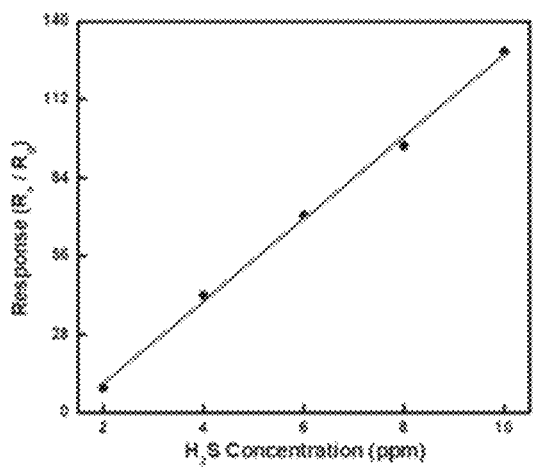
FIG. 10 shows the results of observing the response value during testing of the hydrogen sulfide sensitivity of the $Cu_{0.25}Ni_{0.025}Ni_{0.725}WO_4$ composition at varying concentrations at a temperature of 300° C. In addition, the results in FIG. 10 are used to calculate the limit of detection of hydrogen sulfide gas through Equation 1, Equation 2 and Equation 3.

As a result of examining the response behavior of the $Cu_{0.25}Li_{0.025}Ni_{0.725}WO_4$ composition sensor while changing hydrogen sulfide concentration at the same temperature condition (300° C.), it was confirmed that the $Cu_{0.25}Li_{0.025}Ni_{0.725}WO_4$ composition sensor showed a linear response behavior proportional to the hydrogen sulfide concentration as shown in FIG. 10. In addition, the slope of the linear function of the trend line in FIG. 10 is calculated as 14.7075 $ppm^{-1}$, and the calculated slope value is used to calculate the limit of detection of the $Cu_{0.25}Li_{0.025}Ni_{0.725}WO_4$ composition sensor for hydrogen sulfide gas at 300° C. according to Equation 2 (see Table 4 below).

Figure 11:
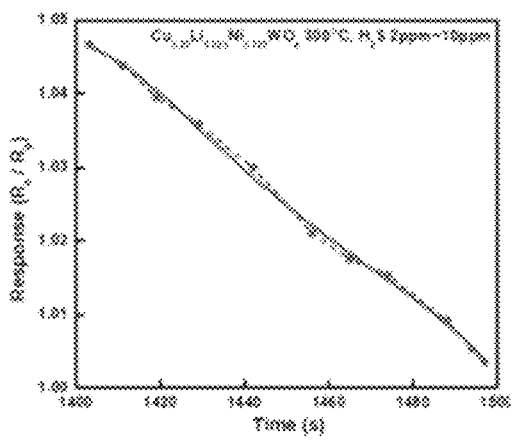
FIG. 11 shows the results obtained by averaging and plotting the resistance after gas injection versus the resistance before gas injection, at any point of time in the hydrogen sulfide sensitivity test performed in FIG. 10, and then performing fifth-order polynomial fitting. In addition, the results in FIG. 11 are used to calculate the limit of detection of hydrogen sulfide gas through Equation 1, Equation 2 and Equation 3.

FIG. 11 depicts graphs showing the average response value, which is the ratio of the resistance after gas injection to the resistance before gas injection, which occurs in the $Cu_{0.25}Li_{0.025}Ni_{0.725}WO_4$ composition sensor in the hydrogen sulfide sensitivity test performed with respect to FIG. 10 (hydrogen sulfide gas injection occurred at 1,500 sec). In other words, FIG. 11 shows the mean of the samples selected at any time point relative to the baseline of the response curve before gas injection. The results in Table 3 were obtained by calculating the deviation between the fifth-order polynomial fitting curves and its variance. Based on the linear function slope shown in FIG. 10 and Equations 1, 2 and 3, the limit of detection of the $Cu_{0.25}Li_{0.025}Ni_{0.725}WO_4$ composition sensor for hydrogen sulfide at a temperature of 300° C. could be calculated as 0.149 ppb to 0.158 ppb.

$$S_{Noise}(ppm^{-1}) = \sqrt{V_x^2/(N-1)} \text{ where } V_x^2 = \sum(Y_i - \overline{Y}) \quad \text{[Equation 1]}$$

$$\text{Limit of detection}(ppm^{-1}) = 3 \times S_{Noise}/\text{Slope} \quad \text{[Equation 2]}$$

$$LOD \text{ variation} = 3 \times \left(\frac{S_{Noise}}{\text{Slope}} - \frac{S_{Noise}}{\text{Slope} + \text{Standard Error}}\right) \quad \text{[Equation 3]}$$

TABLE 3

$Cu_{0.25}Li_{0.025}Ni_{0.725}WO_4$

| Time (s) | $Y_i$ | $Y_i - \overline{Y}$ | $(Y_i - \overline{Y})^2$ |
|---|---|---|---|
| 1403 | 1.0468 | 0.00029 | 8.41E−8 |
| 1411 | 1.04379 | −0.00013 | 1.69E−8 |
| 1419 | 1.03946 | −0.00095 | 9.025E−7 |
| 1429 | 1.03585 | 0.00048 | 2.304E−7 |
| 1442 | 1.02999 | 0.00132 | 1.1742E−6 |
| 1456 | 1.02098 | −0.00106 | 1.124E−6 |
| 1465 | 1.0175 | −0.0008 | 6.4E−7 |
| 1474 | 1.01541 | 0.00071 | 5.041E−7 |
| 1488 | 1.00919 | 0.00049 | 2.401E−7 |
| 1494 | 1.00527 | −0.00023 | 5.29E−8 |
| 1497 | 1.00351 | −0.00015 | 2.25E−8 |

TABLE 4

| Materials | Temperature (° C.) | Slope ($ppm^{-1}$) | Standard Error ($ppm^{-1}$) | $V_x^2$ | $RMS_{Noise}$ | LOD (ppb) |
|---|---|---|---|---|---|---|
| $Cu_{0.25}Li_{0.025}Ni_{0.725}WO_4$ | 300 | 14.7075 | 0.42224 | 5.64951 E−6 | 0.000751632 | 0.149~0.158 |

Evaluation Example 4: Valence State Analysis

To compare the valance states of the prepared compositions ($NiWO_4$, $Li_{0.025}Ni_{0.975}WO_4$, $Cu_{0.25}Ni_{0.75}WO_4$, and $Cu_{0.25}Li_{0.025}Ni_{0.725}WO_4$), XPS (FIGS. 12 to 15), UV-VIS spectrometry (FIG. 16) and UPS analysis (FIG. 17) were performed.

Figure 12:
FIG. 12 shows XPS analysis results for bulk samples including the four compositions, respectively, which are results scanned in Ni 2p mode.
Figure 13:
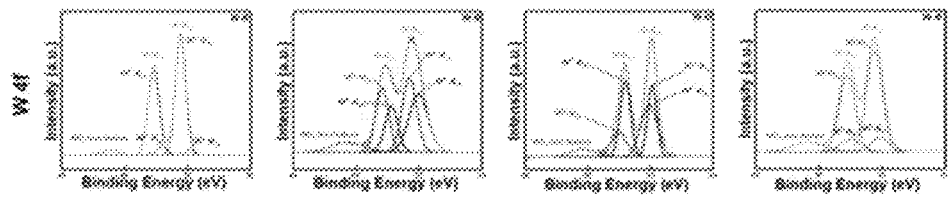
FIG. 13 shows XPS analysis results for bulk samples including the four compositions, respectively, which are results scanned in W 4f mode.

As a result of XPS analysis, as shown in FIG. 12, the valence state of nickel was maintained without significant changes in spite of the composition change. On the other hand, in the case of tungsten, the proportion of the W5+ active site increased as a result of doping, and in the case of the $Cu_{0.25}Li_{0.025}Ni_{0.725}WO_4$ composition obtained by co-doping with copper and lithium, the area showing the proportion of the W5+ active site was located between the value for the lithium-doped composition and the value for the copper-doped composition.

Figure 14:
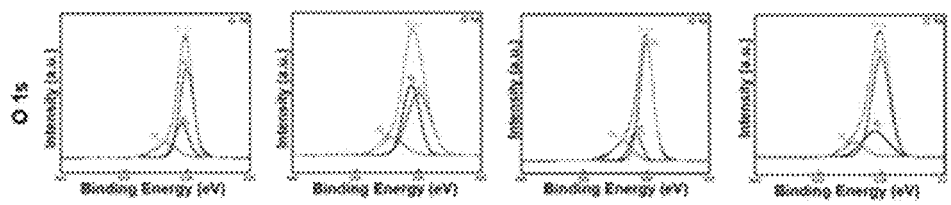
FIG. 14 shows XPS analysis results for bulk samples including the four compositions, respectively, which are results scanned in O 1s mode.

In FIG. 14, it can be seen that the valence state of oxygen changed, and lithium doping increased the proportion of oxygen vacancies increased, but the formation of oxygen vacancies was suppressed by copper doping.

Figure 15:
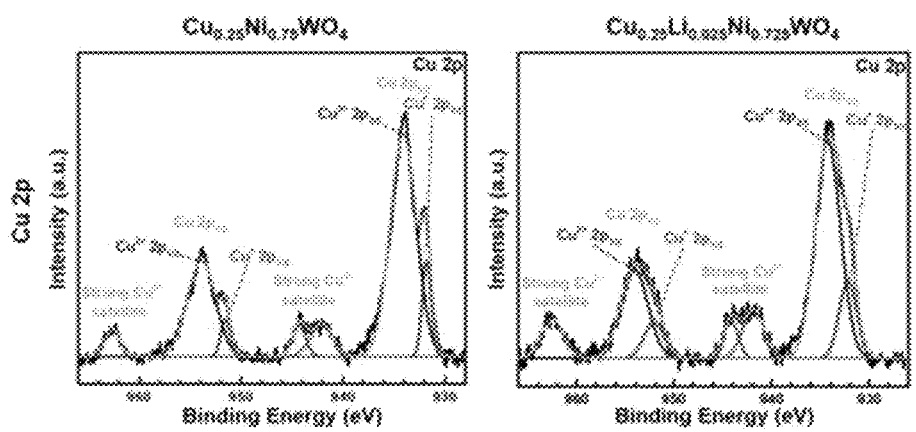
FIG. 15 shows XPS analysis results for bulk samples including the $Cu_{0.25}Ni_{0.75}WO_4$ composition and the $Cu_{0.25}Ni_{0.025}Ni_{0.725}WO_4$ composition, respectively, which are results scanned in Cu 2p mode.

FIG. 15 shows the results of Cu 2p scanning for two compositions ($Li_{0.025}Ni_{0.725}WO_4$, and $Cu_{0.25}Li_{0.025}Ni_{0.725}WO_4$). As can be seen therein, co-doping with copper and lithium led to an increase in the proportion of monovalent cations (Cu+). This phenomenon functions to supplement a charge for the charge imbalance caused by lithium doping, and it can be confirmed that the transition metal copper is partially reduced and remains in an oxidation number state of 1, which acts as a major factor in the effect of increasing the solid solution limit as shown in FIG. 3.

Figure 16:
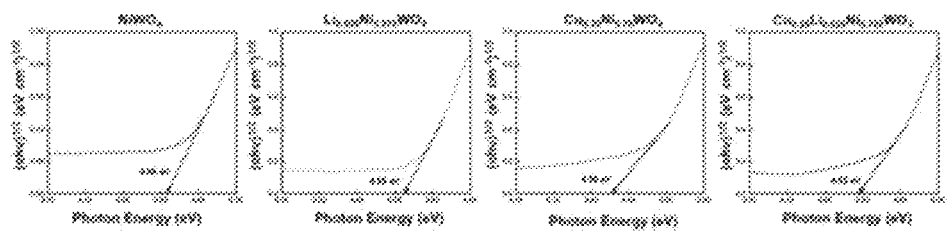
FIG. 16 shows Tauc plots of the UV-Vis absorption spectra of bulk samples including the four compositions, respectively, and indicates indirect optical band gap energy for each of the compositions.

FIG. 16 shows Tauc plots of the UV-Vis absorption spectra of the compositions ($NiWO_4$, $Li_{0.025}Ni_{0.975}WO_4$, $Cu_{0.25}Ni_{0.75}WO_4$, and $Cu_{0.25}Li_{0.025}Ni_{0.725}WO_4$), and indicates indirect optical band gap energy for each of the compositions. As the heat treatment temperatures of the solid-state method performed to the samples were high at 900° C. and 1,100° C., the optical band gap energy of each composition was 4.5 eV or higher. It was confirmed that, for $NiWO_4$, the bandgap energy was 4.66 eV, which increased 4.68 eV upon lithium doping and decreased to 4.56 eV upon copper doping, but for $Cu_{0.25}Li_{0.025}Ni_{0.725}WO_4$ composition obtained by co-doing with copper and lithium, the bandgap energy was located at the middle between the bandgap energy of $Li_{0.025}Ni_{0.975}WO_4$ and the bandgap energy of $Cu_{0.25}Ni_{0.75}WO_4$, suggesting that the change in band gap energy change by ion doping complied with Vegard's band gap law.

Figure 17:
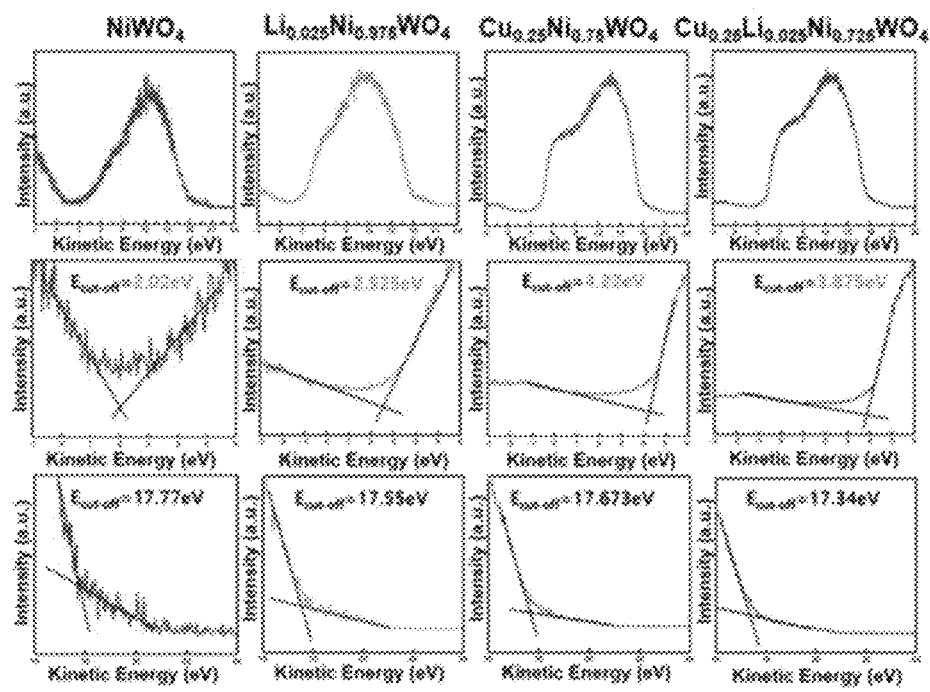
FIG. 17 shows UPS analysis results for bulk samples including the four compositions, respectively, and indicates the work function and cut-off energy between valence band maximum (VBM) and fermi level of each of the compositions.

FIG. 17 shows the results of USP analysis of the bulk samples including the compositions ($NiWO_4$, $Li_{0.025}Ni_{0.975}WO_4$, $Cu_{0.25}Ni_{0.75}WO_4$, and $Cu_{0.25}Li_{0.025}Ni_{0.725}WO_4$), respectively, and indicates the work function and cut-off energy between valence band maximum (VBM) and fermi level of each of the compositions. Based on the band energy structure of each composition shown in FIG. 17 together the optical bandgap energy data of each composition shown in FIG. 16, the results shown in FIG. 18 are obtained.

Figure 18:
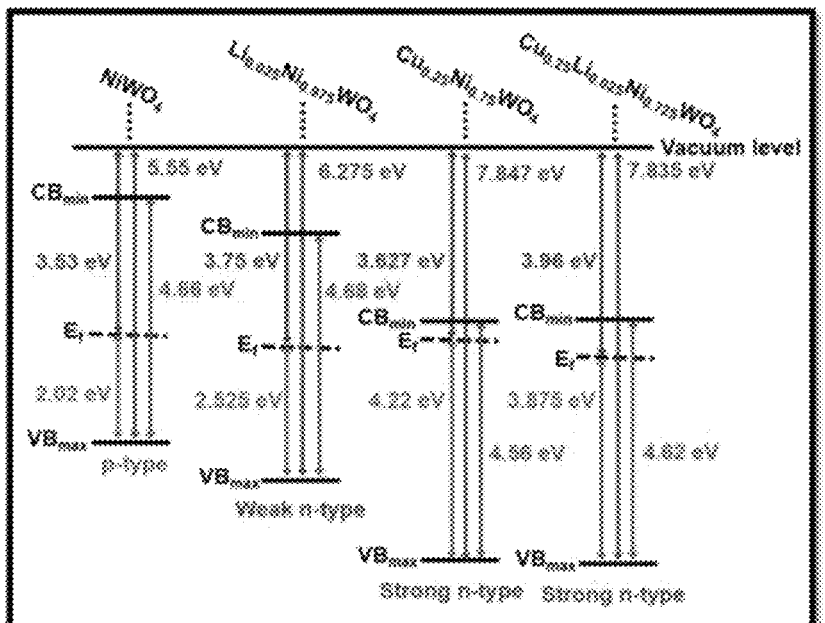
FIG. 18 shows the energy band structure for each composition based on the results obtained in FIGS. 16 and 17.

From the results in FIG. 18, it can be confirmed that in the Fermi level in the $NiWO_4$ composition before doping is close to the VBM direction, suggesting that the $NiWO_4$ composition before doping has p-type conductivity. On the other hand, it can be confirmed that the conductivity type of the $NiWO_4$ composition changed to weak n-type when doped with lithium, and changed to strong n-type when doped with copper. On the other hand, it can be confirmed that the $Cu_{0.25}Li_{0.025}Ni_{0.725}WO_4$ obtained with co-doping with copper and lithium also had n-type conductivity, which was weaker than the copper-doped composition, suggesting that the relative behavior of the Fermi level, which appeared upon co-doping with the two ions, occurred quantitatively depending on doping.

Evaluation Example 5: Analysis of Sensing Mechanism

Figure 19:
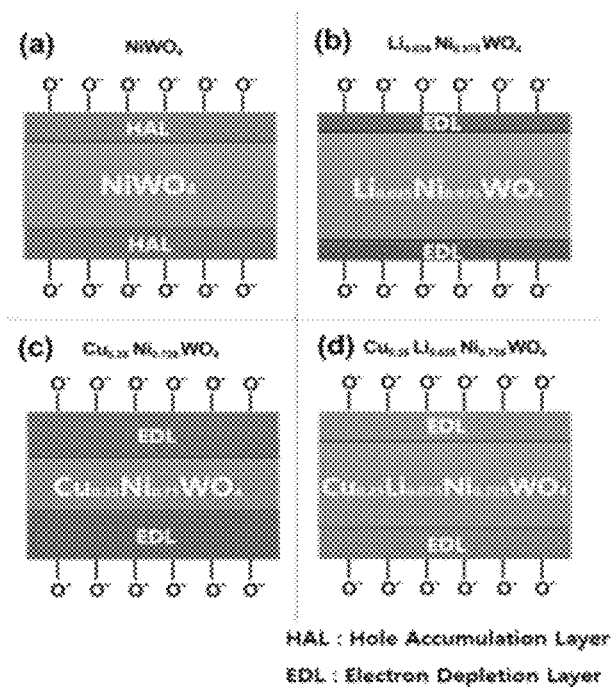
FIG. 19 shows a hole accumulation layer (HAL) (electron depletion layer (EDL)) on the surface of a bulk sample including each composition, which is to be generated at a temperature of 300° C., based on the results shown in FIGS. 9 and 18.

FIG. 19 schematically shows changes in a hole accumulation layer (HAL) on the surface of each the compositions ($NiWO_4$, $Li_{0.025}Ni_{0.975}WO_4$, $Cu_{0.25}Ni_{0.75}WO_4$, and $Cu_{0.25}Li_{0.025}Ni_{0.725}WO_4$) depending on the surface conduction type of each composition as shown in FIGS. 9 and 18.

Figure 20:
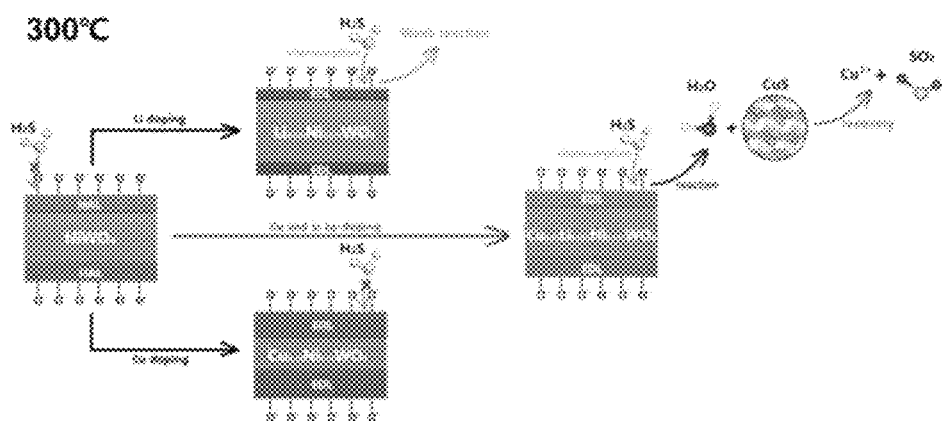
FIG. 20 schematically shows the principle of the hydrogen sulfide-selective resistance change found in the $Cu_{0.25}Ni_{0.025}Ni_{0.725}WO_4$ composition according to the present invention.

From the results of the above-described analyses, the principle of the hydrogen sulfide selective-response behavior of the gas sensor including the $Cu_{0.25}Li_{0.025}Ni_{0.725}WO_4$ composition can be schematically expressed as shown in FIG. 20.

Referring to FIG. 20, in the $NiWO_4$ composition before doping, the activation energy of polaron hopping is high, and thus charge exchange between surface oxygen species, gas molecules, and materials does not easily occur. When the $NiWO_4$ composition having no gas sensitivity is co-doped with lithium and copper, the conductivity type thereof changes to n-type conductivity, and when the $NiWO_4$ composition is doped with lithium, the lithium increases the W5+ active sites, and the polaron formed thereon combines with the electrons of the reducing gas molecule to favor chemisorption. The doped copper reacts with hydrogen sulfide to generate CuS and water molecules, and then the CuS is decomposed into Cu and sulfur oxide ($SO_2$).

In the case of $NiWO_4$, the band gap energy is 4.66 eV. The band gap energy increases to 4.68 eV when $NiWO_4$ is doped with copper, and decreases to 4.56 eV when $NiWO_4$ is doped with lithium. In contrast, in the case of $Cu_{0.25}Li_{0.025}Ni_{0725}WO_4$ in which $NiWO_4$ is co-doped with copper and lithium, the band gap energy is located between the band gap energy of $Li_{0.025}Ni_{0.975}WO_4$ and the band gap energy of $Cu_{0.25}Ni_{0.75}WO_4$. In addition, in $NiWO_4$ before doping, the Fermi level is close in the VBM direction, so that the conduction type thereof is p-type. The conduction type changes to weak n-type when $NiWO_4$ is doped with lithium, and changes to strong n-type when $NiWO_4$ is doped with copper. In contrast, in the case of $Cu_{0.25}Li_{0.025}Ni_{0725}WO_4$ in which $NiWO_4$ is co-doped with copper and lithium, the conduction type is n-type but is less strong than that obtained in the case of being doped with copper, so that the relative behavior of the Fermi level, which appears upon co-doping with the two ions, occurs quantitatively. It can be seen that improved chemical adsorption of and selective response to hydrogen sulfide can be achieved through electronic energy structure control via such band alignment design.

Thus, the doped copper acts as a major element contributing to selective resistance changes in response to hydrogen sulfide and to recovery, suggesting that the effects of the two dopants are complementary to each other, resulting in improved chemical adsorption of and selective response to hydrogen sulfide. Therefore, the composition $Cu_{0.25}Li_{0.025}Ni_{0.725}WO_4$ according to the present invention is highly useful as a hydrogen sulfide sensor, and ensures the above-described excellent selective detection ability and a limit of detection of 1 ppb or less.

In addition, the bulk-based gas sensor 100 including the $Cu_{0.25}Li_{0.025}Ni_{0.725}WO_4$ composition according to the present invention has few pores and low surface energy, and thus is structurally very stable, ensuring high reliability, long response life, and reproducibility.

In addition, as the hydrogen sulfide sensitivity provided by the $Cu_{0.25}Li_{0.025}Ni_{0.725}WO_4$ composition according to the present invention was demonstrated to be sufficiently excellent at the bulk level, when a porous nanostructure is synthesized using the composition of the present composition is synthesized, a gas sensor including the composition and the nanostructure will exhibit excellent hydrogen sulfide sensitivity and will be highly useful.

As described above, preferred embodiments of the present invention have been disclosed in the present specification and the accompanying drawings. Although specific terms have been used, these are only used in a general sense to easily explain the technical content of the present invention and aid in the understanding of the disclosure, and are not intended to limit the scope of the present invention.

It will be apparent to those of ordinary skill in the art to which the present invention pertains that, in addition to the embodiments disclosed herein, other modifications based on the technical spirit of the present invention may be implemented.

What is claimed is:

1. A composition for a hydrogen sulfide gas sensor consisting of copper, lithium, and $NiWO_4$, wherein the $NiWO_4$ is co-doped with the copper and the lithium, wherein the composition is represented by the following Formula 1:

$$Cu_xLi_yNi_{1-x-y}WO_4, \qquad \text{[Formula 1]}$$

wherein X and Y are 0≤x<1 and 0≤y<1, respectively.

2. The composition of claim 1, wherein the composition is .

3. The composition of claim 1, wherein the composition detects hydrogen sulfide through electronic energy structure control via band alignment design.

4. A hydrogen sulfide gas sensor comprising:
a substrate;
an electrode; and
a sensing layer formed on a top, bottom, or side surface of the electrode and comprising the composition for a hydrogen sulfide gas sensor according to claim 1.

5. The hydrogen sulfide gas sensor of claim 4, wherein the electrode is a silver (Ag) electrode.

6. The hydrogen sulfide gas sensor of claim 4, wherein the substrate is a ceramic and/or alumina substrate.

7. A method for preparing a composition for a hydrogen sulfide gas sensor, the method comprising steps of:
(1) mixing $NiO$, $Li_2CO_3$, $CuO$ and $WO_3$ powders together at a molar ratio of 0.720 to 0.725:1.0 to 1.05:0.0120 to 0.0125:0.25 to 0.255, followed by calcination, thus preparing a powder mixture;
(2) applying pressure of 100 MPa to 150 MPa at room temperature to the powder mixture by an isostatic pressing process, thus preparing a green body; and
(3) subjecting the green body to normal-pressure sintering.

8. The method of claim 7, wherein the calcination in step (1) is performed at a temperature of 850° C. to 900° C. for 12 to 16 hours in an atmospheric atmosphere.

9. The method of claim 7, wherein the sintering in step (3) is performed at a temperature of 900 to 1,100° C. in an atmospheric atmosphere.

\* \* \* \* \*